US009525729B2

(12) United States Patent
He et al.

(10) Patent No.: US 9,525,729 B2
(45) Date of Patent: Dec. 20, 2016

(54) REMOTE MONITORING POOL MANAGEMENT

(71) Applicant: NetApp Inc., Sunnyvale, CA (US)

(72) Inventors: Stephanie Zhimao He, Fremont, CA (US); Dennis Lalchan Ramdass, Mountain View, CA (US)

(73) Assignee: NETAPP, INC., Sunnyvale, CA (US)

( * ) Notice: Subject to any disclaimer, the term of this patent is extended or adjusted under 35 U.S.C. 154(b) by 300 days.

(21) Appl. No.: 14/243,318

(22) Filed: Apr. 2, 2014

(65) Prior Publication Data

US 2015/0288753 A1 Oct. 8, 2015

(51) Int. Cl.
G06F 15/17 (2006.01)
H04L 29/08 (2006.01)
H04L 12/24 (2006.01)
H04L 12/26 (2006.01)

(52) U.S. Cl.
CPC ......... *H04L 67/1012* (2013.01); *H04L 41/042* (2013.01); *H04L 41/0806* (2013.01); *H04L 43/12* (2013.01); *H04L 41/044* (2013.01)

(58) Field of Classification Search
CPC .................................................. H04L 67/1012
See application file for complete search history.

(56) References Cited

U.S. PATENT DOCUMENTS 5,692,193 A * 11/1997 Jagannathan ........... G06F 8/451
711/6
8,312,120 B2 * 11/2012 Ram ..................... G06F 9/5083
709/223
2002/0078174 A1 * 6/2002 Sim .................... G06F 17/30194
709/219
2004/0010716 A1 * 1/2004 Childress ............ G06F 11/0748
709/223
2006/0092861 A1 * 5/2006 Corday ................... H04L 67/34
370/256
2010/0106990 A1 * 4/2010 Kalman ................ G06F 1/3221
713/323
2013/0155855 A1 * 6/2013 Kross .................. H04L 12/5695
370/230
2015/0032839 A1 1/2015 Serokurov et al.

* cited by examiner

Primary Examiner — Moustafa M Meky
Assistant Examiner — Sm Z Islam
(74) Attorney, Agent, or Firm — Klein, O'Neill & Singh, LLP

(57) ABSTRACT

One or more techniques and/or systems are provided for remotely and/or automatically managing a monitoring pool of management servers configured to monitor resources, such as storage devices. For example, a monitoring installer package may be sent from a remote source to a management server for remote installation of a monitoring component capable of monitoring resources. The monitoring installer package may be remotely executed from the remote source to install the monitoring component on the management server. The management server may be assigned to the monitoring pool, and may be configured to monitor, utilizing the monitoring component, a set of resources of a resource pool. In this way, management servers may be remotely added to and/or removed from the monitoring pool. Load balancing may be remotely performed for the management servers assigned to the monitoring pool.

20 Claims, 12 Drawing Sheets

REMOTE MONITORING POOL MANAGEMENT

BACKGROUND

A computing environment may comprise one or more resources, such as databases, virtual machines, applications, servers, storage devices, etc. For example, a network storage environment may comprise one or more storage controller resources that are configured to provide client devices with access to data stored on storage device resources accessible from the respective storage controller resources.

DETAILED DESCRIPTION

Figure 1:
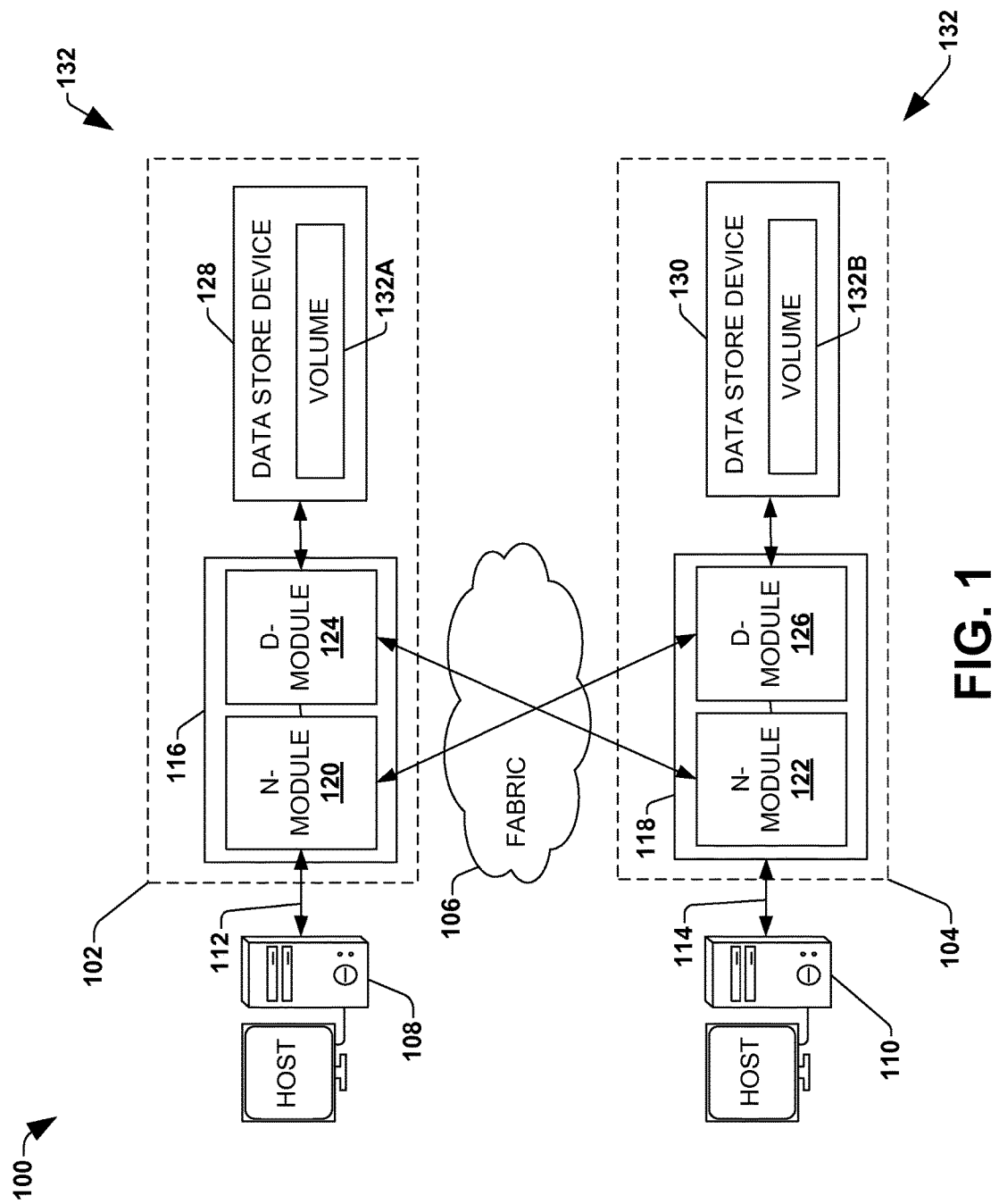
FIG. 1 is a component block diagram illustrating an example clustered network in accordance with one or more of the provisions set forth herein.

Some examples of the claimed subject matter are now described with reference to the drawings, where like reference numerals are generally used to refer to like elements throughout. In the following description, for purposes of explanation, numerous specific details are set forth in order to provide an understanding of the claimed subject matter. It may be evident, however, that the claimed subject matter may be practiced without these specific details. Nothing in this detailed description is admitted as prior art.

One or more systems and/or techniques for managing a monitoring pool of management servers are provided. The monitoring pool may comprise as assignment one or more management servers configured to monitoring resources assigned to a resource pool (e.g., a first management server may monitor 15 storage device resources, a second management server may monitor 4 storage device resources, and/or other management servers may monitor storage device resources or other resources for health information, performance information, configuration information, and/or other resource information). As provided herein, management servers may be remotely added to and/or removed from the monitoring pool. For example, a monitoring installer package may be sent to a management server for remote installation of a monitoring component on the management. The monitoring component may be configured to monitor a set of resources. In an example, a management server may be automatically deployed to the monitoring pool based upon a current monitoring load of the monitoring pool exceeding a load threshold (e.g., a new virtual machine may be automatically provisioned and added into the monitoring pool for monitoring resources based upon the monitoring pool being overburdened with too many resources to monitor). Load balancing may be performed between management servers within the monitoring pool based upon various metrics, such as a fault tolerance metric, a hierarchy similarity metric (e.g., a single management server may be assigned to monitor volumes of a storage device resource, which may reduce a number of calls to the storage device resource that would otherwise occur if multiple management servers were to separately monitor the volumes), a geographical proximity metric, a monitoring task similarity metric (e.g., a single management server may be assigned to perform quota monitoring tasks, while another management server may be assigned to perform volume monitoring tasks), etc.

To provide context for managing a monitoring pool of management servers, FIG. 1 illustrates an embodiment of a clustered network environment 100. It may be appreciated, however, that the techniques, etc. described herein may be implemented within the clustered network environment 100, a non-cluster network environment, a multi-cluster network environment, and/or a variety of other computing environments, such as a desktop computing environment. That is, the instant disclosure, including the scope of the appended claims, is not meant to be limited to the examples provided herein. It will be appreciated that where the same or similar components, elements, features, items, modules, etc. are illustrated in later figures but were previously discussed with regard to prior figures, that a similar (e.g., redundant) discussion of the same may be omitted when describing the subsequent figures (e.g., for purposes of simplicity and ease of understanding).

FIG. 1 is a block diagram illustrating an example clustered network environment 100 that may implement at least some embodiments of the techniques and/or systems described herein. The example environment 100 comprises data storage systems or storage sites 102 and 104 that are coupled over a cluster fabric 106, such as a computing network embodied as a private Infiniband or Fibre Channel (FC) network facilitating communication between the storage systems 102 and 104 (and one or more modules, component, etc. therein, such as, nodes 116 and 118, for example). It will be appreciated that while two data storage systems 102 and 104 and two nodes 116 and 118 are illustrated in FIG. 1, that any suitable number of such components is contemplated. In an example, nodes 116, 118 comprise storage controllers (e.g., node 116 may comprise a primary or local storage controller and node 118 may comprise a secondary or remote storage controller) that provide client devices, such as host devices 108, 110, with access to data stored within data storage devices 128, 130. Similarly, unless specifically provided otherwise herein, the same is true for other modules, elements, features, items, etc. referenced herein and/or illustrated in the accompanying drawings. That is, a particular number of components, modules, elements, features, items, etc. disclosed herein is not meant to be interpreted in a limiting manner.

It will be further appreciated that clustered networks are not limited to any particular geographic areas and can be clustered locally and/or remotely. Thus, in one embodiment a clustered network can be distributed over a plurality of storage systems and/or nodes located in a plurality of geographic locations; while in another embodiment a clustered network can include data storage systems (e.g., 102, 104) residing in a same geographic location (e.g., in a single onsite rack of data storage devices).

In the illustrated example, one or more host devices 108, 110 which may comprise, for example, client devices, personal computers (PCs), computing devices used for storage (e.g., storage servers), and other computers or peripheral devices (e.g., printers), are coupled to the respective data storage systems 102, 104 by storage network connections 112, 114. Network connection may comprise a local area network (LAN) or wide area network (WAN), for example, that utilizes Network Attached Storage (NAS) protocols, such as a Common Internet File System (CIFS) protocol or a Network File System (NFS) protocol to exchange data packets. Illustratively, the host devices 108, 110 may be general-purpose computers running applications, and may interact with the data storage systems 102, 104 using a client/server model for exchange of information. That is, the host device may request data from the data storage system (e.g., data on a storage device managed by a network storage control configured to process I/O commands issued by the host device for the storage device), and the data storage system may return results of the request to the host device via one or more network connections 112, 114.

The nodes 116, 118 on clustered data storage systems 102, 104 can comprise network or host nodes that are interconnected as a cluster to provide data storage and management services, such as to an enterprise having remote locations, for example. Such a node in a data storage and management network cluster environment 100 can be a device attached to the network as a connection point, redistribution point or communication endpoint, for example. A node may be capable of sending, receiving, and/or forwarding information over a network communications channel, and could comprise any device that meets any or all of these criteria. One example of a node may be a data storage and management server attached to a network, where the server can comprise a general purpose computer or a computing device particularly configured to operate as a server in a data storage and management system.

In an example, a first cluster of nodes such as the nodes 116, 118 (e.g., a first set of storage controllers configured to provide access to a first storage aggregate comprising a first logical grouping of one or more storage devices) may be located on a first storage site. A second cluster of nodes, not illustrated, may be located at a second storage site (e.g., a second set of storage controllers configured to provide access to a second storage aggregate comprising a second logical grouping of one or more storage devices). The first cluster of nodes and the second cluster of nodes may be configured according to a disaster recovery configuration (e.g., utilizing information replicated between replication databases at the first storage site and the second storage site) where a surviving cluster of nodes provides switchover access to storage devices of a disaster cluster of nodes in the event a disaster occurs at a disaster storage site comprising the disaster cluster of nodes (e.g., the first cluster of nodes provides client devices with switchover data access to storage devices of the second storage aggregate in the event a disaster occurs at the second storage site).

As illustrated in the exemplary environment 100, nodes 116, 118 can comprise various functional components that coordinate to provide distributed storage architecture for the cluster. For example, the nodes can comprise a network module 120, 122 (e.g., N-Module, or N-Blade) and a data module 124, 126 (e.g., D-Module, or D-Blade). Network modules 120, 122 can be configured to allow the nodes 116, 118 (e.g., network storage controllers) to connect with host devices 108, 110 over the network connections 112, 114, for example, allowing the host devices 108, 110 to access data stored in the distributed storage system. Further, the network modules 120, 122 can provide connections with one or more other components through the cluster fabric 106. For example, in FIG. 1, a first network module 120 of first node 116 can access a second data storage device 130 by sending a request through a second data module 126 of a second node 118.

Data modules 124, 126 can be configured to connect one or more data storage devices 128, 130, such as disks or arrays of disks, flash memory, or some other form of data storage, to the nodes 116, 118. The nodes 116, 118 can be interconnected by the cluster fabric 106, for example, allowing respective nodes in the cluster to access data on data storage devices 128, 130 connected to different nodes in the cluster. Often, data modules 124, 126 communicate with the data storage devices 128, 130 according to a storage area network (SAN) protocol, such as Small Computer System Interface (SCSI) or Fiber Channel Protocol (FCP), for example. Thus, as seen from an operating system on a node 116, 118, the data storage devices 128, 130 can appear as locally attached to the operating system. In this manner, different nodes 116, 118, etc. may access data blocks through the operating system, rather than expressly requesting abstract files.

It should be appreciated that, while the example embodiment 100 illustrates an equal number of N and D modules, other embodiments may comprise a differing number of these modules. For example, there may be a plurality of N and/or D modules interconnected in a cluster that does not have a one-to-one correspondence between the N and D modules. That is, different nodes can have a different number of N and D modules, and the same node can have a different number of N modules than D modules.

Further, a host device 108, 110 can be networked with the nodes 116, 118 in the cluster, over the networking connections 112, 114. As an example, respective host devices 108, 110 that are networked to a cluster may request services (e.g., exchanging of information in the form of data packets) of a node 116, 118 in the cluster, and the node 116, 118 can return results of the requested services to the host devices 108, 110. In one embodiment, the host devices 108, 110 can exchange information with the network modules 120, 122 residing in the nodes (e.g., network hosts) 116, 118 in the data storage systems 102, 104.

In one embodiment, the data storage devices 128, 130 comprise volumes 132, which is an implementation of storage of information onto disk drives or disk arrays or other storage (e.g., flash) as a file-system for data, for example. Volumes can span a portion of a disk, a collection of disks, or portions of disks, for example, and typically define an overall logical arrangement of file storage on disk space in the storage system. In one embodiment a volume can comprise stored data as one or more files that reside in a hierarchical directory structure within the volume.

Volumes are typically configured in formats that may be associated with particular storage systems, and respective volume formats typically comprise features that provide functionality to the volumes, such as providing an ability for volumes to form clusters. For example, where a first storage system may utilize a first format for their volumes, a second storage system may utilize a second format for their volumes.

In the example environment 100, the host devices 108, 110 can utilize the data storage systems 102, 104 to store and retrieve data from the volumes 132. In this embodiment, for example, the host device 108 can send data packets to the N-module 120 in the node 116 within data storage system 102. The node 116 can forward the data to the data storage device 128 using the D-module 124, where the data storage device 128 comprises volume 132A. In this way, in this example, the host device can access the storage volume 132A, to store and/or retrieve data, using the data storage system 102 connected by the network connection 112. Further, in this embodiment, the host device 110 can exchange data with the N-module 122 in the host 118 within the data storage system 104 (e.g., which may be remote from the data storage system 102). The host 118 can forward the data to the data storage device 130 using the D-module 126, thereby accessing volume 132B associated with the data storage device 130.

It may be appreciated that monitoring pool management may be implemented within the clustered network environment 100. For example, a monitoring pool management component may be associated with the clustered network environment 100. The monitoring pool management component may be configured to manage a monitoring pool of management servers that are configured to monitor resources, such as the data storage device 128, the volume 132A, the data storage device 130, the volume 132B, the node 116, the node 118, and/or a variety of other resources.

Figure 2:
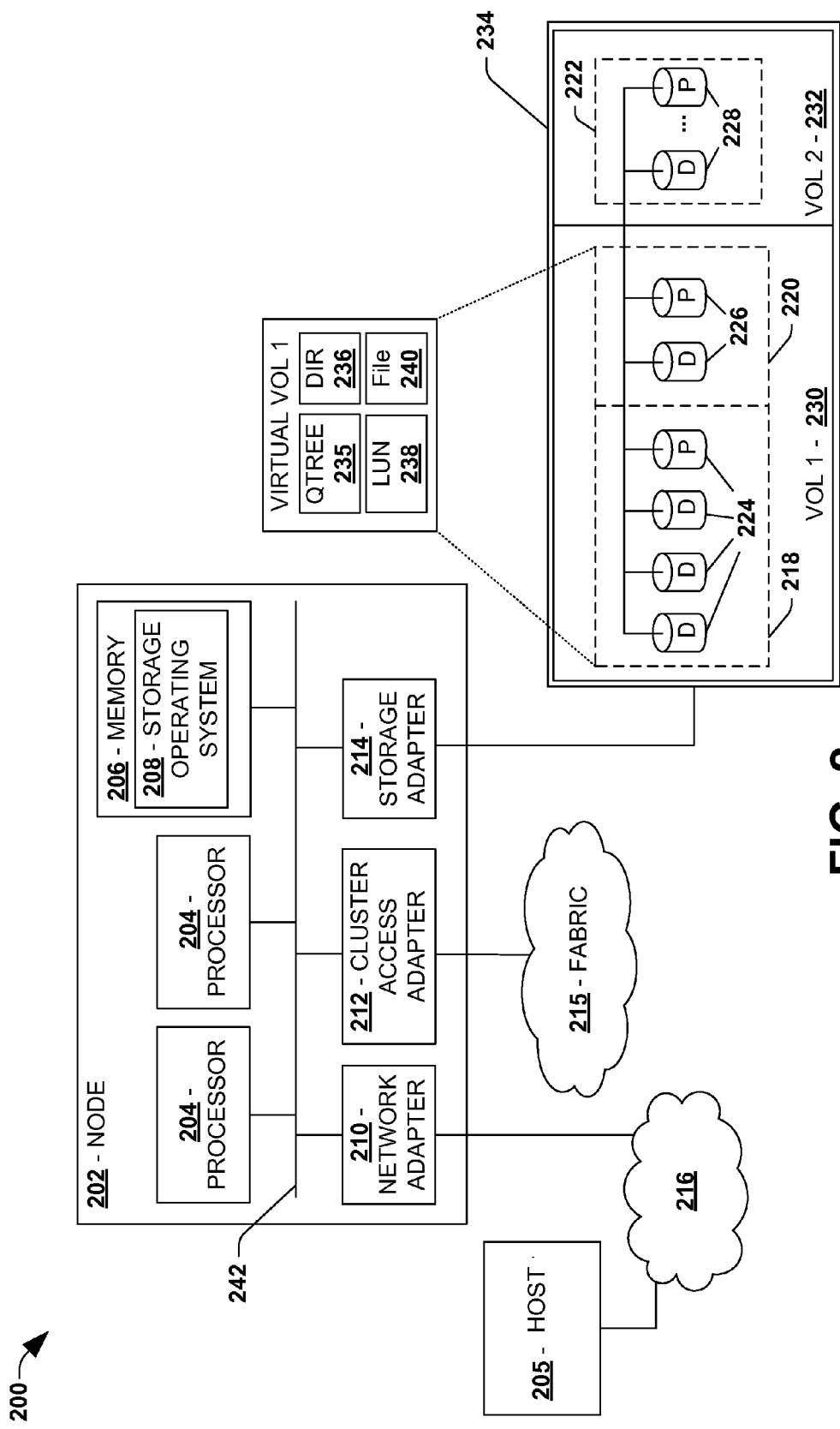
FIG. 2 is a component block diagram illustrating an example data storage system in accordance with one or more of the provisions set forth herein.

FIG. 2 is an illustrative example of a data storage system or storage site 200 (e.g., 102, 104 in FIG. 1), providing further detail of an embodiment of components that may implement one or more of the techniques and/or systems described herein. The example data storage system 200 comprises a node 202 (e.g., host nodes 116, 118 in FIG. 1), and a data storage device 234 (e.g., data storage devices 128, 130 in FIG. 1). The node 202 may be a general purpose computer, for example, or some other computing device particularly configured to operate as a storage server. A host device 205 (e.g., 108, 110 in FIG. 1) can be connected to the node 202 over a network 216, for example, to provide access to files and/or other data stored on the data storage device 234. In an example, the node 202 comprises a storage controller that provides client devices, such as the host device 205, with access to data stored within data storage device 234.

The data storage device 234 can comprise mass storage devices, such as disks 224, 226, 228 of a disk array 218, 220, 222. It will be appreciated that the techniques and systems, described herein, are not limited by the example embodiment. For example, disks 224, 226, 228 may comprise any type of mass storage devices, including but not limited to magnetic disk drives, flash memory, and any other similar media adapted to store information, including, for example, data (D) and/or parity (P) information.

The node 202 comprises one or more processors 204, a memory 206, a network adapter 210, a cluster access adapter 212, and a storage adapter 214 interconnected by a system bus 242. The storage system 200 also includes an operating system 208 installed in the memory 206 of the node 202 that can, for example, implement a Redundant Array of Independent (or Inexpensive) Disks (RAID) optimization technique to optimize a reconstruction process of data of a failed disk in an array.

The operating system 208 can also manage communications for the data storage system, and communications between other data storage systems that may be in a clustered network, such as attached to a cluster fabric 215 (e.g., 106 in FIG. 1). Thus, the node 202, such as a network storage controller, can respond to host device requests to manage data on the data storage device 234 (e.g., or additional clustered devices) in accordance with these host device requests. The operating system 208 can often establish one or more file systems on the data storage system 200, where a file system can include software code and data structures that implement a persistent hierarchical namespace of files and directories, for example. As an example, when a new data storage device (not shown) is added to a clustered network system, the operating system 208 is informed where, in an existing directory tree, new files associated with the new data storage device are to be stored. This is often referred to as "mounting" a file system.

In the example data storage system 200, memory 206 can include storage locations that are addressable by the processors 204 and adapters 210, 212, 214 for storing related software program code and data structures. The processors 204 and adapters 210, 212, 214 may, for example, include processing elements and/or logic circuitry configured to execute the software code and manipulate the data structures. The operating system 208, portions of which are typically resident in the memory 206 and executed by the processing elements, functionally organizes the storage system by, among other things, invoking storage operations in support of a file service implemented by the storage system. It will be apparent to those skilled in the art that other processing and memory mechanisms, including various computer readable media, may be used for storing and/or executing program instructions pertaining to the techniques described herein. For example, the operating system can also utilize one or more control files (not shown) to aid in the provisioning of virtual machines.

The network adapter 210 includes the mechanical, electrical and signaling circuitry needed to connect the data storage system 200 to a host device 205 over a computer network 216, which may comprise, among other things, a point-to-point connection or a shared medium, such as a local area network. The host device 205 (e.g., 108, 110 of FIG. 1) may be a general-purpose computer configured to execute applications. As described above, the host device 205 may interact with the data storage system 200 in accordance with a client/host model of information delivery.

The storage adapter 214 cooperates with the operating system 208 executing on the node 202 to access information requested by the host device 205 (e.g., access data on a storage device managed by a network storage controller). The information may be stored on any type of attached array of writeable media such as magnetic disk drives, flash memory, and/or any other similar media adapted to store information. In the example data storage system 200, the information can be stored in data blocks on the disks 224, 226, 228. The storage adapter 214 can include input/output (I/O) interface circuitry that couples to the disks over an I/O interconnect arrangement, such as a storage area network (SAN) protocol (e.g., Small Computer System Interface (SCSI), iSCSI, hyperSCSI, Fiber Channel Protocol (FCP)). The information is retrieved by the storage adapter 214 and, if necessary, processed by the one or more processors 204 (or the storage adapter 214 itself) prior to being forwarded over the system bus 242 to the network adapter 210 (and/or the cluster access adapter 212 if sending to another node in the cluster) where the information is formatted into a data packet and returned to the host device 205 over the network connection 216 (and/or returned to another node attached to the cluster over the cluster fabric 215).

In one embodiment, storage of information on arrays 218, 220, 222 can be implemented as one or more storage "volumes" 230, 232 that are comprised of a cluster of disks 224, 226, 228 defining an overall logical arrangement of disk space. The disks 224, 226, 228 that comprise one or more volumes are typically organized as one or more groups of RAIDs. As an example, volume 230 comprises an aggregate of disk arrays 218 and 220, which comprise the cluster of disks 224 and 226.

In one embodiment, to facilitate access to disks 224, 226, 228, the operating system 208 may implement a file system (e.g., write anywhere file system) that logically organizes the information as a hierarchical structure of directories and files on the disks. In this embodiment, respective files may be implemented as a set of disk blocks configured to store information, whereas directories may be implemented as specially formatted files in which information about other files and directories are stored.

Whatever the underlying physical configuration within this data storage system 200, data can be stored as files within physical and/or virtual volumes, which can be associated with respective volume identifiers, such as file system identifiers (FSIDs), which can be 32-bits in length in one example.

A physical volume corresponds to at least a portion of physical storage devices whose address, addressable space, location, etc. doesn't change, such as at least some of one or more data storage devices 234 (e.g., a Redundant Array of Independent (or Inexpensive) Disks (RAID system)). Typically the location of the physical volume doesn't change in that the (range of) address(es) used to access it generally remains constant.

A virtual volume, in contrast, is stored over an aggregate of disparate portions of different physical storage devices. The virtual volume may be a collection of different available portions of different physical storage device locations, such as some available space from each of the disks 224, 226, and/or 228. It will be appreciated that since a virtual volume is not "tied" to any one particular storage device, a virtual volume can be said to include a layer of abstraction or virtualization, which allows it to be resized and/or flexible in some regards.

Further, a virtual volume can include one or more logical unit numbers (LUNs) 238, directories 236, qtrees 235, and files 240. Among other things, these features, but more particularly LUNS, allow the disparate memory locations within which data is stored to be identified, for example, and grouped as data storage unit. As such, the LUNs 238 may be characterized as constituting a virtual disk or drive upon which data within the virtual volume is stored within the aggregate. For example, LUNs are often referred to as virtual drives, such that they emulate a hard drive from a general purpose computer, while they actually comprise data blocks stored in various parts of a volume.

In one embodiment, one or more data storage devices 234 can have one or more physical ports, wherein each physical port can be assigned a target address (e.g., SCSI target address). To represent respective volumes stored on a data storage device, a target address on the data storage device can be used to identify one or more LUNs 238. Thus, for example, when the node 202 connects to a volume 230, 232 through the storage adapter 214, a connection between the node 202 and the one or more LUNs 238 underlying the volume is created.

In one embodiment, respective target addresses can identify multiple LUNs, such that a target address can represent multiple volumes. The I/O interface, which can be implemented as circuitry and/or software in the storage adapter 214 or as executable code residing in memory 206 and executed by the processors 204, for example, can connect to volume 230 by using one or more addresses that identify the LUNs 238.

It may be appreciated that monitoring pool management may be implemented for the data storage system 200. For example, a monitoring pool management component may be configured to manage a monitoring pool of management servers that are configured to monitor resources, such as the node 202, the disks 224 226, and 228, volumes 230, 232, data storage device 234, etc.

Figure 3:
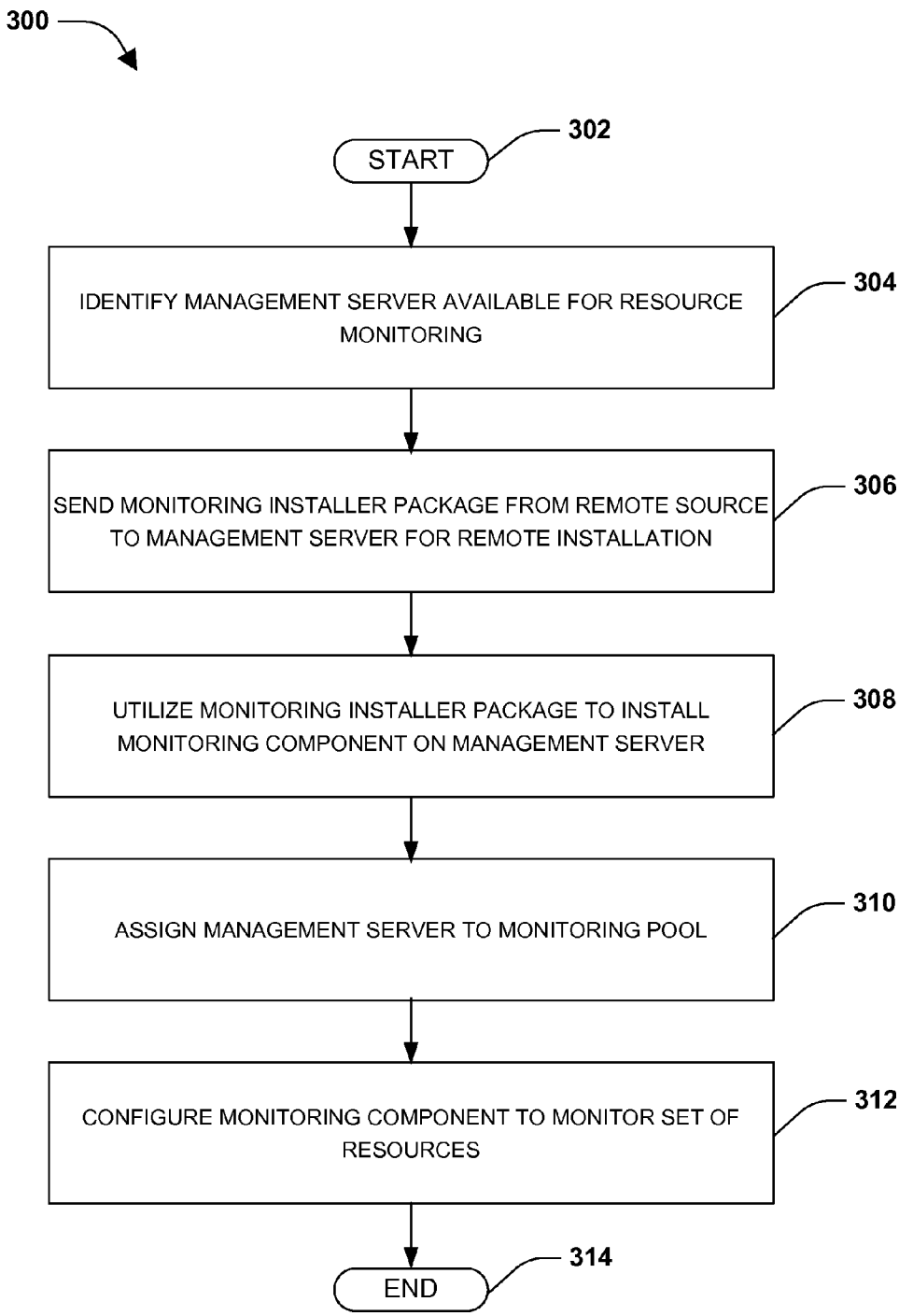
FIG. 3 is a flow chart illustrating an exemplary method of managing a monitoring pool of management servers.

One embodiment of managing a monitoring pool of management servers is illustrated by an exemplary method 300 of FIG. 3. At 302, the method starts. A monitoring pool may comprise an assignment of management servers that are configured to monitoring various aspects of resources assigned to a resource pool (e.g., a storage device resource, a virtual machine resource, a storage controller resource, a server resource, an application resource, a database resource, or any other type of computing resource). For example, a network storage environment may comprise a plurality of storage device resources that may be located at various storage sites (e.g., 100 storage devices distributed across various storage sites). The management servers may be configured to monitor health information of storage devices, storage objects/properties of storage devices (e.g., LUN information, volume information, etc.), and/or a variety of storage information associated with the storage devices. Real-time load balancing may be implemented for the monitoring pool (e.g., a first management server may be configured to monitor 10 storage devices, a second management server may be configured to monitor 15 storage devices, etc.).

At 304, a management server may be identified as being available for resource monitoring. In an example of identifying the management server, a monitoring pool management component may be hosted on a remote source (e.g., a computing device, such as an existing management server, that is different than the management server). The monitoring pool management component may evaluate load information of the monitoring pool to determine whether a current monitoring load exceeds a load threshold (e.g., the current monitoring load and/or the load threshold may be adjusted based upon detection of a new resource to be monitored and/or provision of a new management server for monitoring). If the current monitoring load exceeds the load threshold (e.g., indicating that the monitoring pool does not comprise a sufficient assignment of management servers for managing the resources of the resource pool), then the monitoring pool management component may automatically identify and provision the management server for monitoring a set of resources of the resource pool. In another example of identifying the management server, a new virtual machine may be created as the management server (e.g., responsive to determining that the current monitoring load exceeds the load threshold, the new virtual machine may be created and deployed for monitoring the set of resources).

In another example of identifying the management server, an auto discovery technique may be utilized to identify a candidate management server (e.g., the auto discovery technique may evaluate a subnet to discover a newly added computing device as the candidate management server). An available bandwidth of the candidate management server may be evaluated. Responsive to the available bandwidth exceeding a bandwidth threshold, the candidate management server may be identified as the management server. In another example of identifying the management server, a fault tolerance metric may be generated for the monitoring pool. Responsive to the fault tolerance metric exceeding a fault tolerance threshold, the management server may be identified for assignment to the monitoring pool such as to improve fault tolerance for monitoring resources. In this way, the management server may be identified for resource monitoring.

At 306, a monitoring installer package may be sent from the remote source to the management server for remote installation of a monitoring component (e.g., monitoring functionality that may be executed by the management server for monitoring resources, such as resources that are remote to the management server). At 308, the monitoring installer package may be utilized to install the monitoring component on the management server. For example, the monitoring installer package may be remotely executed, at the management server, from the remote source.

At 310, the management server may be assigned to the monitoring pool of management servers that monitor resources of the resource pool. At 312, the monitoring component may be configured to monitor a set of resources of the resource pool (e.g., one or more resources may be reassigned from relatively overburdened management servers within the monitoring pool to the management server in order to efficiently balance loads across the monitoring pool). In an example, the monitoring component may be configured to access a resource information database (e.g., the management server may be configured to access a database comprising various monitoring information about resources, such as identification information of a resource, a health state of a resource such as an amount of free storage space remaining for a storage device resource, descriptive information about a resource, an object associated with a resource such as a volume object of a storage device resource, operational information about a resource such as a latency of a storage device resource, and/or a variety of other monitoring information).

In an example, the set of resources may be identified based upon a storage hierarchy similarity metric (e.g., the monitoring component may be assigned to a storage cluster, a storage aggregate, a volume, a LUN, and/or other storage objects that may be logically grouped in a manner that may mitigate calls from management servers to a resource, such as an assignment where a single management server monitors volumes of a storage device resource), a geographical proximity metric (e.g., the monitoring component may be assigned to a storage device that is located within a geographical proximity to the management server, which may reduce communication latency), a monitoring task similarity metric (e.g., the monitoring component may be assigned to do quota monitoring, volume monitoring, or another monitoring task), etc. In this way, the monitoring component may be invoked to store monitoring information associated with the set of resource into the resource information database.

Monitoring loads may be dynamically balanced amongst management servers assigned to the management pool. For example, monitoring of a resource may be reassigned from a first management server to a second management server based upon the second management server having relatively more available bandwidth for monitoring than the first management server. In an example, load balancing may be automatically and/or remotely performed by the monitoring pool management component. In an example, an under loaded management server may be removed from the monitoring pool (e.g., based upon a remote removal command sent by the monitoring pool management component to the under loaded management server, which may be released for other tasks). In this way, management servers may be automatically and/or remotely added to and/or removed from the monitoring pool. At 314, the method ends.

Figure 4A:
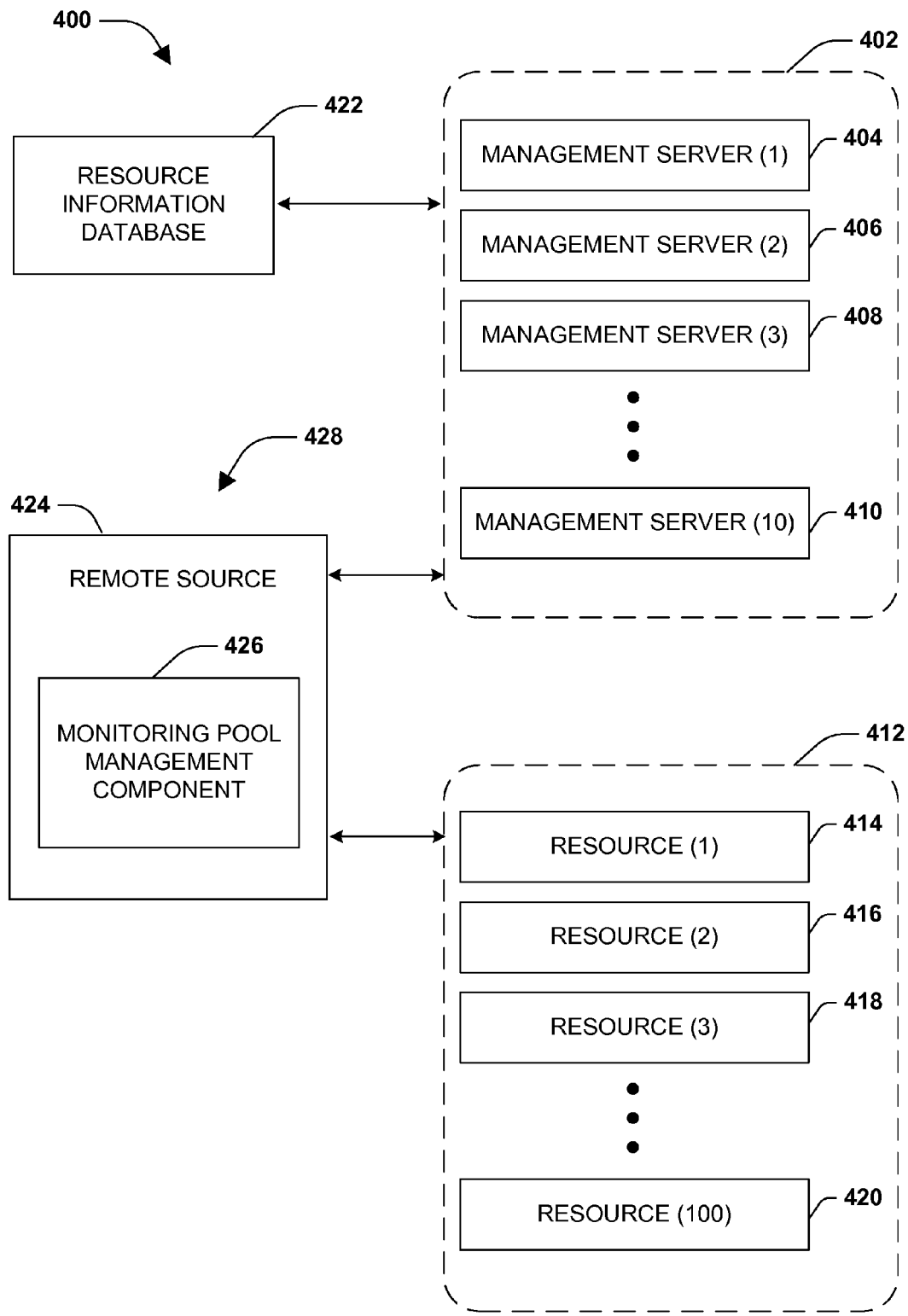
FIG. 4A is an example of a remote source hosting a monitoring pool management component.

FIGS. 4A-4H illustrate examples of a system 428, comprising a monitoring pool management component 426, for managing a monitoring pool 402 of management servers. FIG. 4A illustrates an example 400 of a remote source 424 (e.g., a computing device, such as a current management server within the monitoring pool 402, that is different than a management server that is to be newly deployed to the monitoring pool 402) hosting the monitoring pool management component 426. The monitoring pool management component 426 may be configured to manage the monitoring pool 402 comprising an assignment of a first management server 404, a second management server 406, a third management server 408, and/or other management servers such as a tenth management server 410. Such management servers may host monitoring components configured to monitor resources assigned to a resource pool 412, such as a first resource 414 (e.g., a first storage device), a second resource 416 (e.g., a second storage device), a third resource 418 (e.g., a third storage device), and/or other resources such as a hundredth resource 420. The monitoring components may be configured to store monitoring information within a resource information database 422.

The monitoring pool management component 426 may be configured to evaluate load information associated with the monitoring pool 402. For example, the monitoring pool management component 426 may determine that a current monitoring load of the monitoring pool 402 exceeds a load threshold (e.g., the monitoring pool 402 is not assigned a sufficient number of management servers for adequately monitoring the resource pool 412). Accordingly, the monitoring pool management component 426 may automatically identify a management server that may be a candidate for assignment to the monitoring pool 402 for monitoring a set of the resources of the resource pool 412, which may alleviate one or more overburdened management servers within the monitoring pool 402.

Figure 4B:
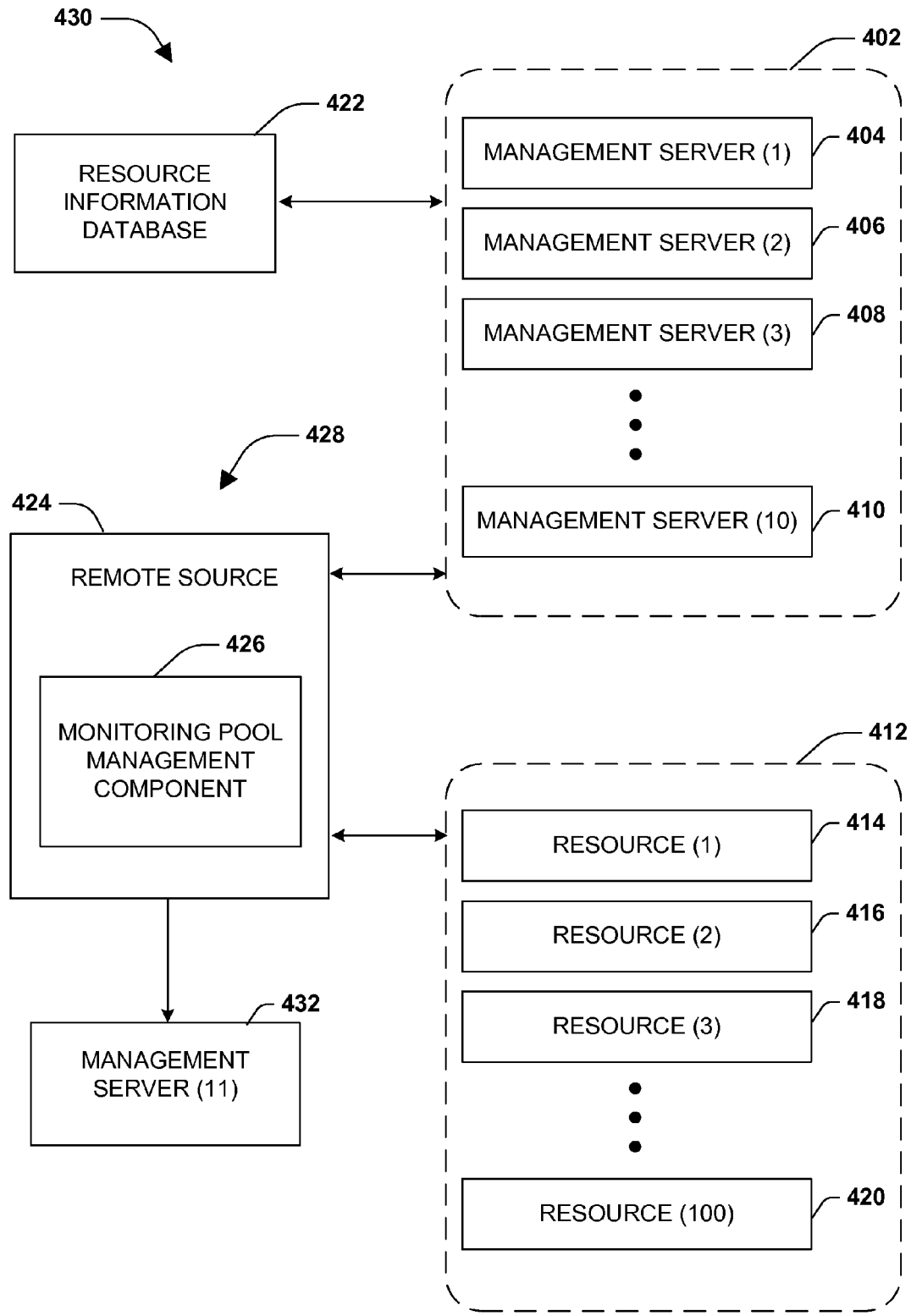
FIG. 4B is an example of automated discovery of a management server.

FIG. 4B illustrates an example 430 of automated discovery of a management server. For example, the monitoring pool management component 426 may utilize an auto discovery technique (e.g., based upon the current monitoring load of the monitoring group 402 exceeding the load threshold) to identify a candidate management server (e.g., a subnet may be scanned to identify an eleventh management server 432). The monitoring pool management component 426 may evaluate an available bandwidth of the candidate management server. Responsive to the available bandwidth exceeding a bandwidth threshold, the candidate management server may be identified as the management server. In this way, the eleventh management server 432 may be identified for deployment to the monitoring pool 402.

Figure 4C:
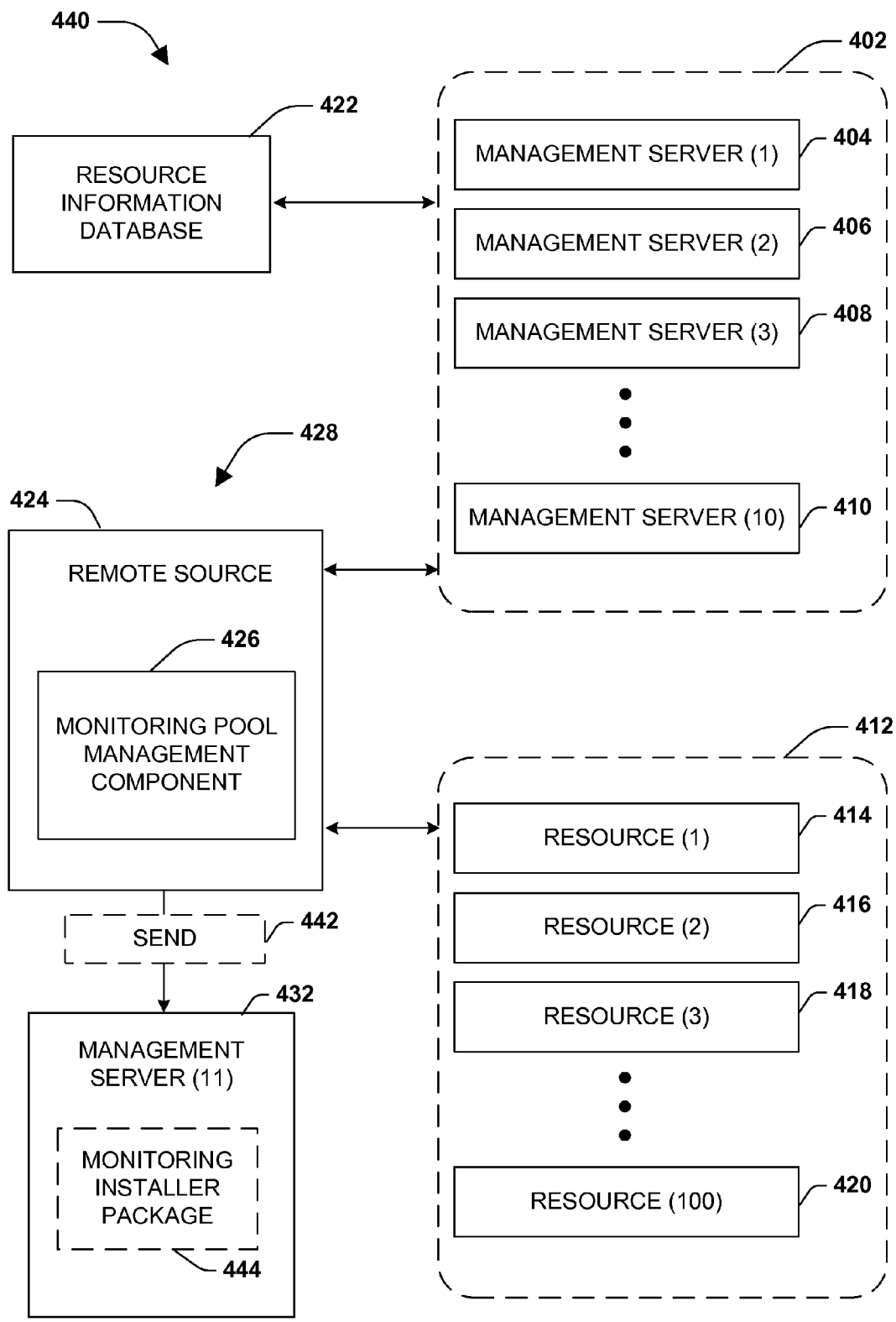
FIG. 4C is an example of remote deployment of a monitoring installer package.
Figure 4D:
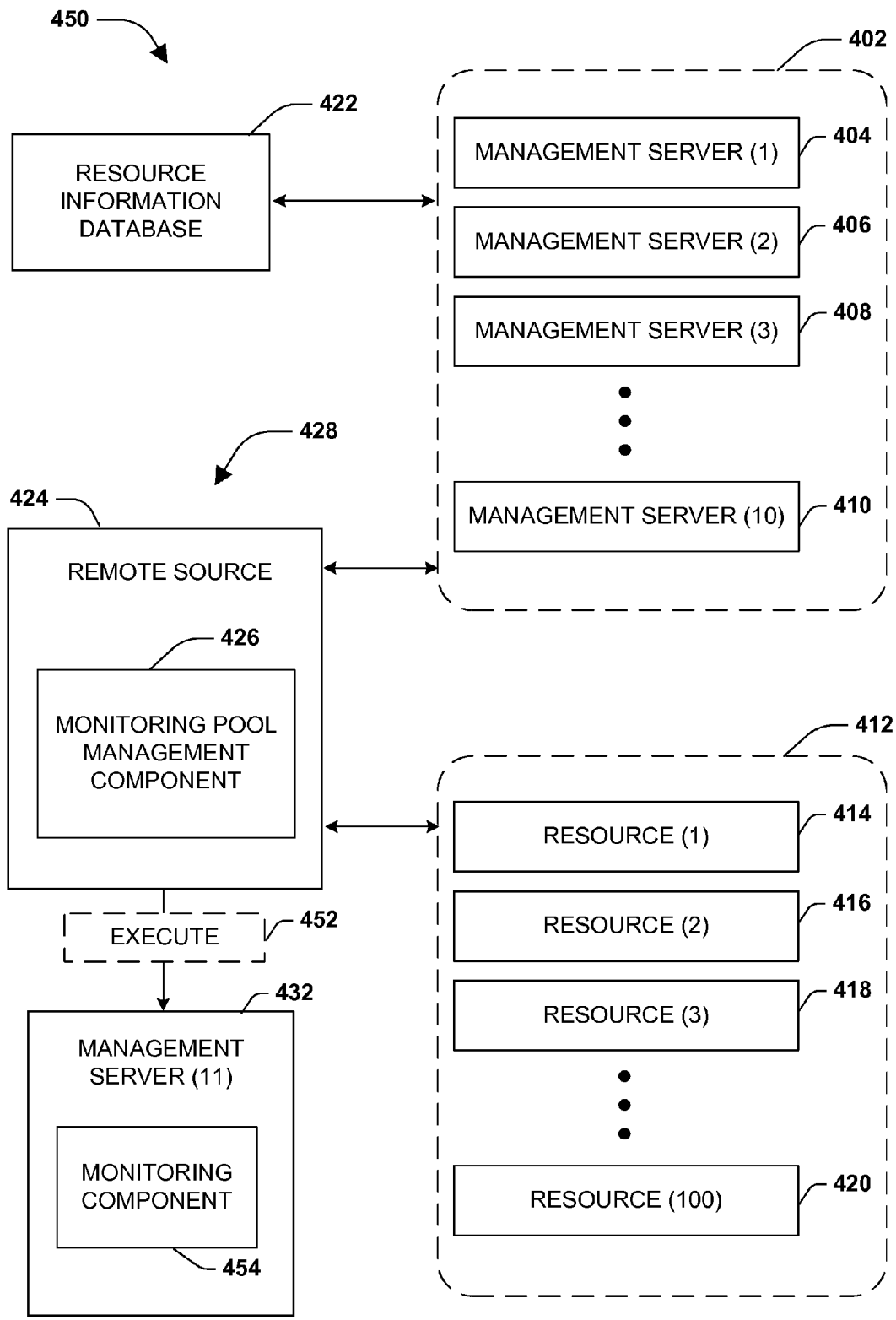
FIG. 4D is an example of remote installation of a monitoring component.

FIG. 4C illustrates an example 440 of remote deployment of a monitoring installer package 444. The monitoring pool management component 426 may be configured to send 442 the monitoring installer package 444 to the eleventh management server 432 for remote installation of a monitoring component on the eleventh management server 432. FIG. 4D illustrates an example 450 of remote installation of a monitoring component 454. The monitoring pool management component 426 may remotely execute 452 the monitoring installer package 444 on the eleventh management server 432 to install the monitoring component 454 on the eleventh management server 432.

Figure 4E:
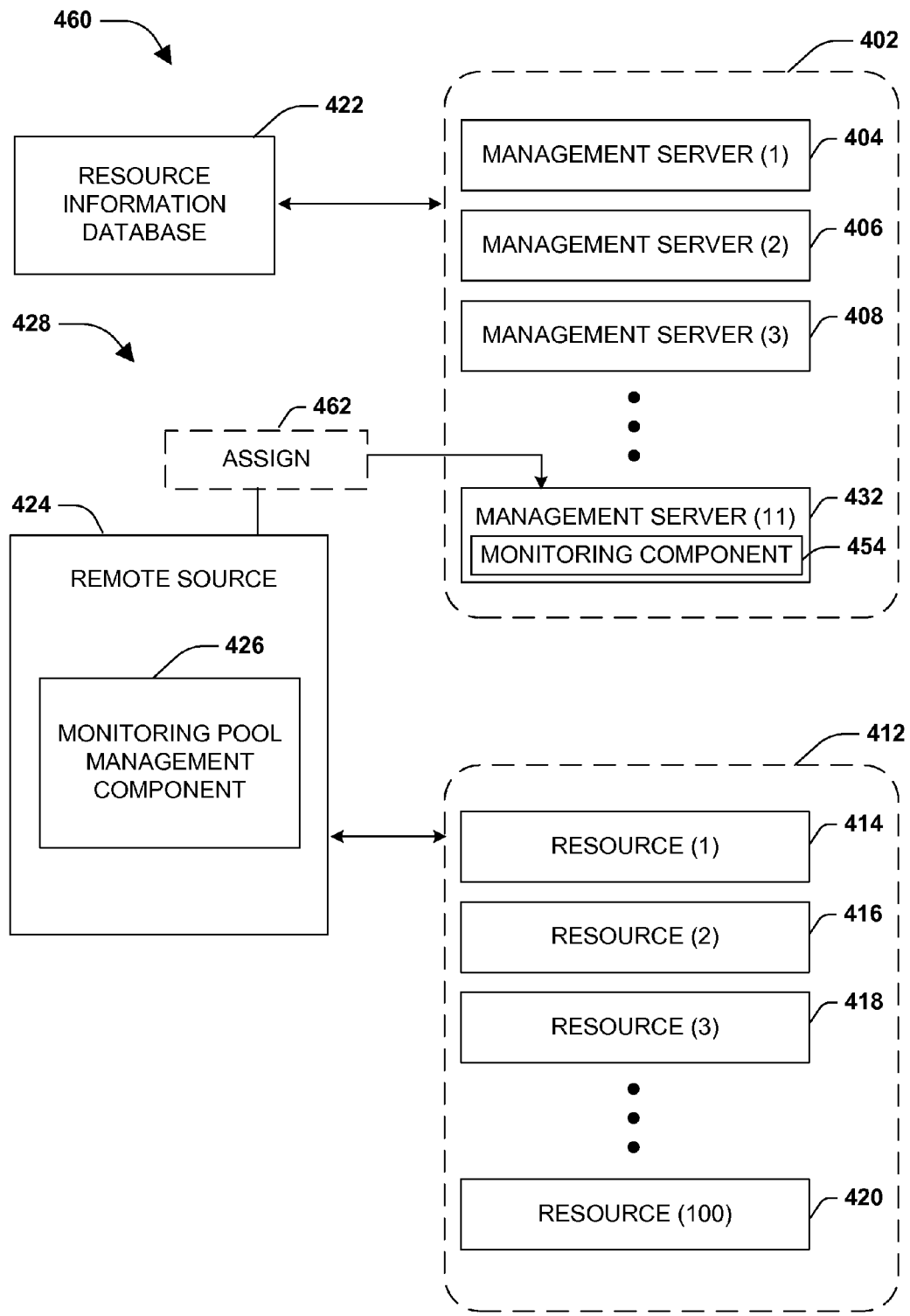
FIG. 4E is an example of remotely managing a monitoring pool.
Figure 4F:
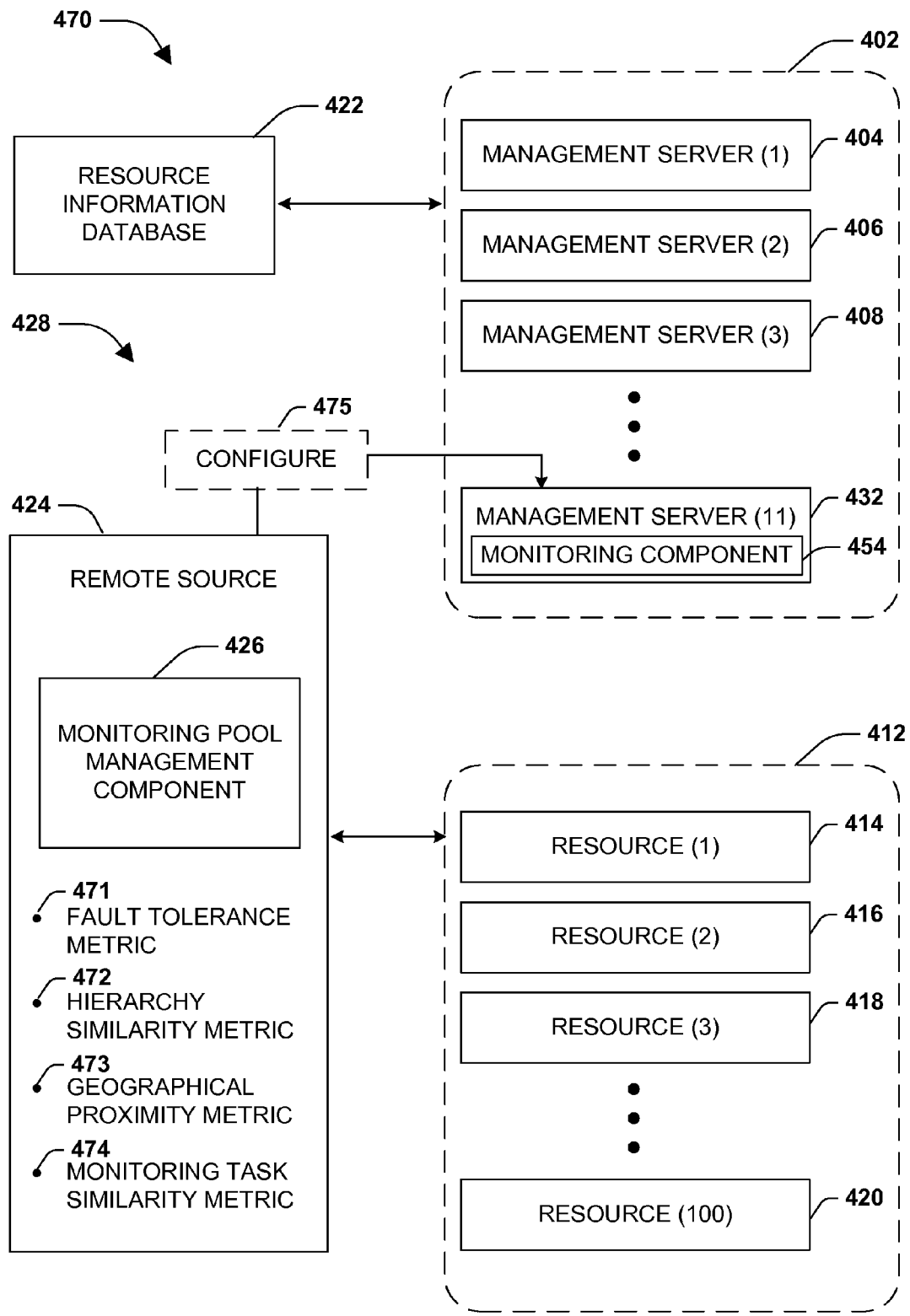
FIG. 4F is an example of remotely managing a monitoring pool.

FIG. 4E illustrates an example 460 of remotely managing the monitoring pool 402. The monitoring pool management component 426 may remotely assign 462 the eleventh management server 432 to the monitoring pool 402 for monitoring of resources assigned to the resource pool 412. FIG. 4F illustrates an example 470 of remotely managing the monitoring pool 402. The monitoring pool management component 426 may configure 475 the eleventh management server 432, such as the monitoring component 454, based upon a variety of criteria/metrics. The eleventh management server 432 may be configured to access the resource information database 422 and/or may be configured to monitor a set of resources of the resource pool 412 (e.g., a seventh resource, an eighth resource, and/or other resources may be reassigned from a relatively overburdened management server to the eleventh management server 432). In an example, the set of resources, to which the eleventh management server 432 is assigned for monitoring, may be identified based upon a fault tolerance metric 471 (e.g., a relatively small amount of resources may be selected for monitoring so that the eleventh management server 432 may be available to provide failover monitoring in the event another management server fails), a hierarchy similarity metric 472 (e.g., the eleventh management server 432 may be assigned to monitor volumes of a particular storage controller resource), a geographical proximity metric 473 (e.g., the eleventh management server 432 may be assigned to monitor a storage controller resource based upon a relatively low communication latency/path between the eleventh management server 432 and the storage controller resource), a monitoring task similarity metric 474 (e.g., the eleventh management server 432 may be assigned to perform volume monitoring tasks), etc.

Figure 4G:
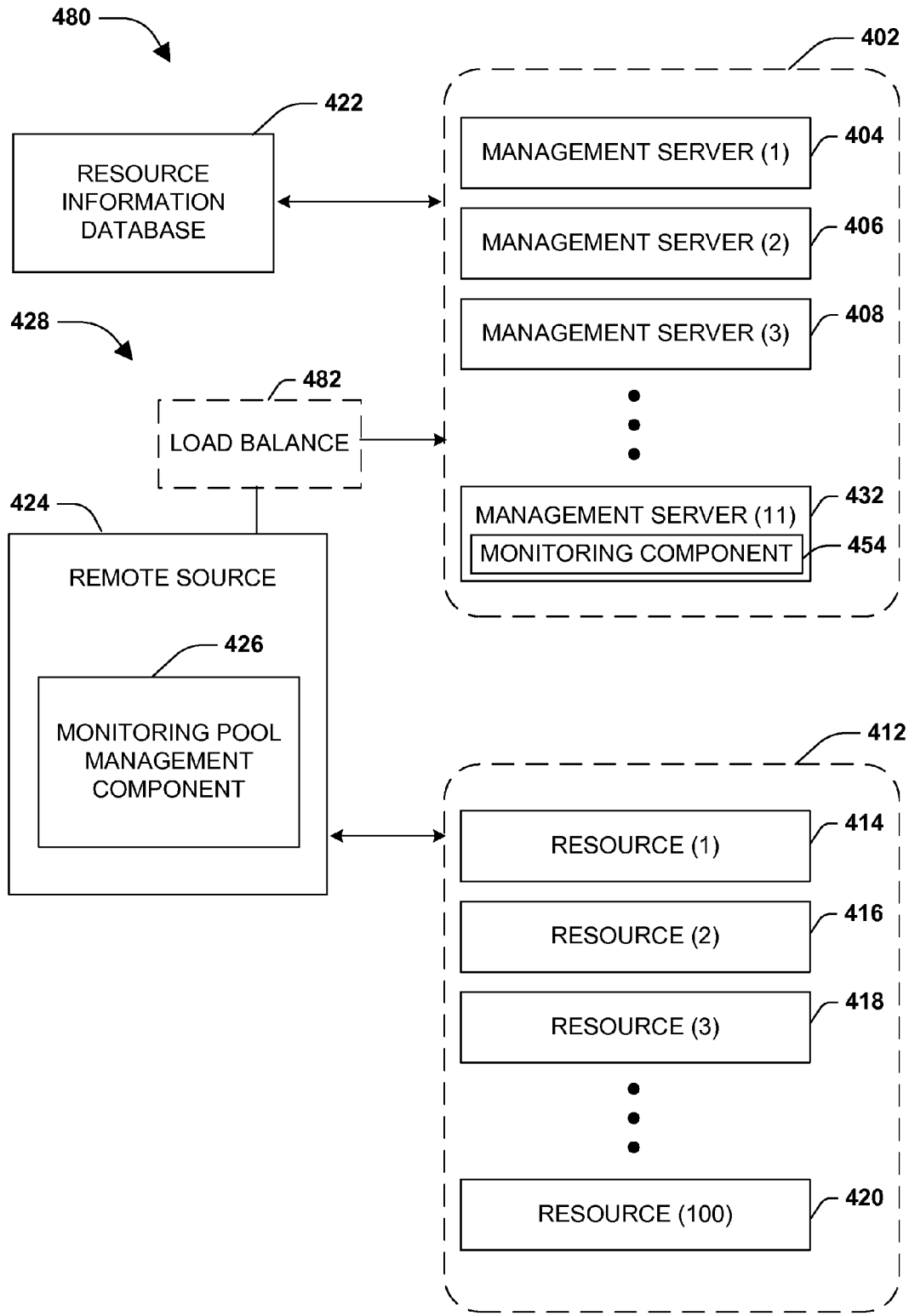
FIG. 4G is an example of remotely load balancing a resource pool amongst the monitoring pool.
Figure 4H:
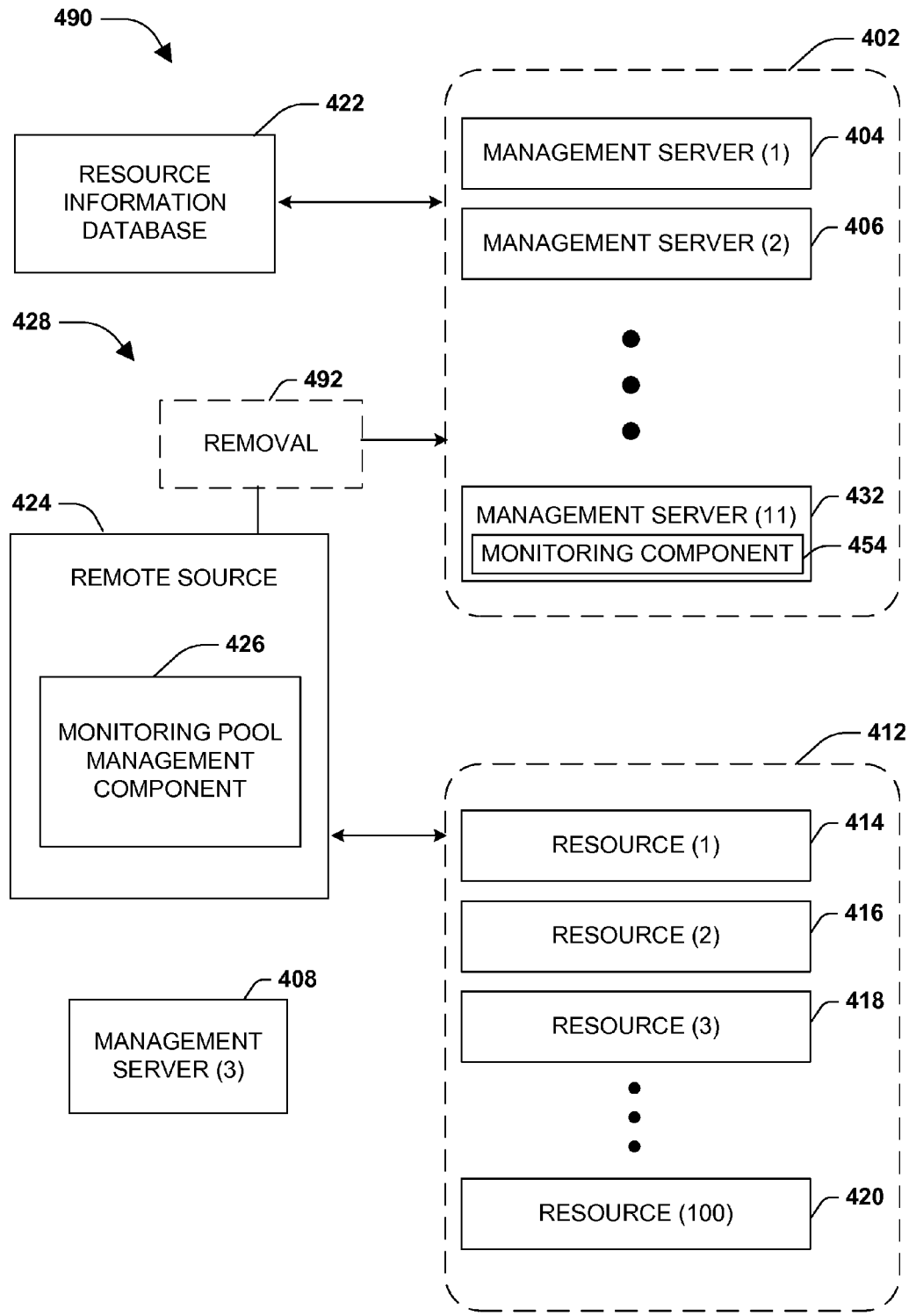
FIG. 4H is an example of remotely removing an under loaded management server from the monitoring pool.

FIG. 4G illustrates an example 480 of remotely load balancing 482 the resource pool 412 amongst the monitoring pool 402. The monitoring pool management component 426 may assign, unassign, and/or reassign management servers to monitor resources assigned to the resource pool 412, such as in real-time based upon load information associated with the monitoring pool 402. FIG. 4H illustrates an example 490 of remotely removing 492 an under loaded management server from the monitoring pool 402. In an example, the monitoring pool management component 426 may determine that the monitoring pool 402 comprises too many management servers with respect to the amount of resources that are to be monitored in the resource pool 412. For example, the monitoring pool management component 426 may determine that the third management server 408 is under loaded, and thus may be removed 492 from the monitoring pool 402 for other tasks. Resources assigned to the third management server 408 may be reassigned to one or more management servers remaining within the monitoring pool 402.

Figure 5:
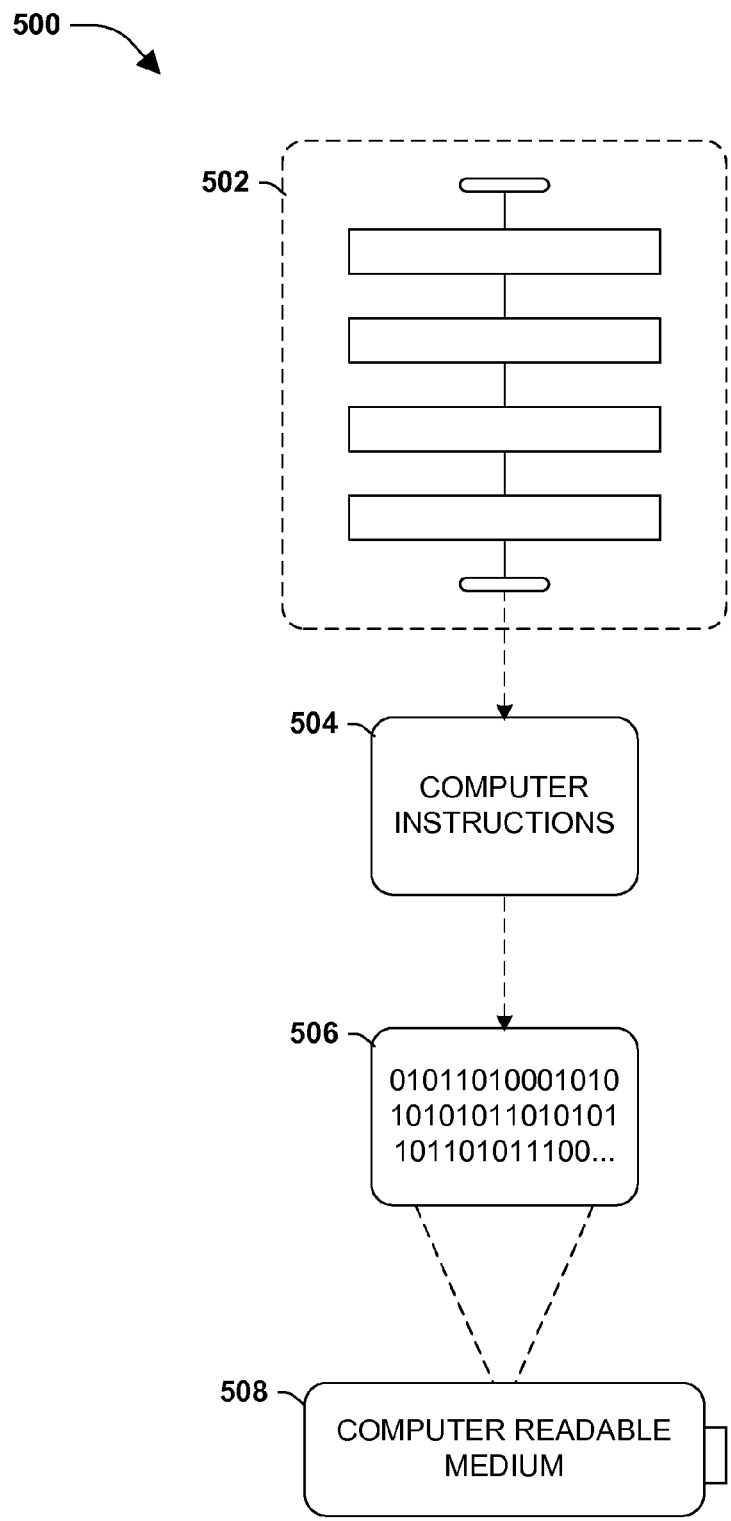
FIG. 5 is an example of a computer readable medium in accordance with one or more of the provisions set forth herein.

Still another embodiment involves a computer-readable medium comprising processor-executable instructions configured to implement one or more of the techniques presented herein. An example embodiment of a computer-readable medium or a computer-readable device that is devised in these ways is illustrated in FIG. 5, wherein the implementation 500 comprises a computer-readable medium 508, such as a CD-R, DVD-R, flash drive, a platter of a hard disk drive, etc., on which is encoded computer-readable data 506. This computer-readable data 506, such as binary data comprising at least one of a zero or a one, in turn comprises a set of computer instructions 504 configured to operate according to one or more of the principles set forth herein. In some embodiments, the processor-executable computer instructions 504 are configured to perform a method 502, such as at least some of the exemplary method 300 of FIG. 3 and/or at least some of the exemplary method 500 of FIG. 5, for example. In some embodiments, the processor-executable instructions 504 are configured to implement a system, such as at least some of the exemplary system 428 of FIGS. 4A-4H, for example. Many such computer-readable media are contemplated to operate in accordance with the techniques presented herein.

It will be appreciated that processes, architectures and/or procedures described herein can be implemented in hardware, firmware and/or software. It will also be appreciated that the provisions set forth herein may apply to any type of special-purpose computer (e.g., file host, storage server and/or storage serving appliance) and/or general-purpose computer, including a standalone computer or portion thereof, embodied as or including a storage system. Moreover, the teachings herein can be configured to a variety of storage system architectures including, but not limited to, a network-attached storage environment and/or a storage area network and disk assembly directly attached to a client or host computer. Storage system should therefore be taken broadly to include such arrangements in addition to any subsystems configured to perform a storage function and associated with other equipment or systems.

In some embodiments, methods described and/or illustrated in this disclosure may be realized in whole or in part on computer-readable media. Computer readable media can include processor-executable instructions configured to implement one or more of the methods presented herein, and may include any mechanism for storing this data that can be thereafter read by a computer system. Examples of computer readable media include (hard) drives (e.g., accessible via network attached storage (NAS)), Storage Area Networks (SAN), volatile and non-volatile memory, such as read-only memory (ROM), random-access memory (RAM), EEPROM and/or flash memory, CD-ROMs, CD-Rs, CD-RWs, DVDs, cassettes, magnetic tape, magnetic disk storage, optical or non-optical data storage devices and/or any other medium which can be used to store data.

Although the subject matter has been described in language specific to structural features or methodological acts, it is to be understood that the subject matter defined in the appended claims is not necessarily limited to the specific features or acts described above. Rather, the specific features and acts described above are disclosed as example forms of implementing at least some of the claims.

Various operations of embodiments are provided herein. The order in which some or all of the operations are described should not be construed to imply that these operations are necessarily order dependent. Alternative ordering will be appreciated given the benefit of this description. Further, it will be understood that not all operations are necessarily present in each embodiment provided herein. Also, it will be understood that not all operations are necessary in some embodiments.

Furthermore, the claimed subject matter is implemented as a method, apparatus, or article of manufacture using standard programming or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, many modifications may be made to this configuration without departing from the scope or spirit of the claimed subject matter.

As used in this application, the terms "component", "module," "system", "interface", and the like are generally intended to refer to a computer-related entity, either hardware, a combination of hardware and software, software, or software in execution. For example, a component includes a process running on a processor, a processor, an object, an executable, a thread of execution, a program, or a computer. By way of illustration, both an application running on a controller and the controller can be a component. One or more components residing within a process or thread of execution and a component may be localized on one computer or distributed between two or more computers.

Moreover, "exemplary" is used herein to mean serving as an example, instance, illustration, etc., and not necessarily as advantageous. As used in this application, "or" is intended to mean an inclusive "or" rather than an exclusive "or". In addition, "a" and "an" as used in this application are generally be construed to mean "one or more" unless specified otherwise or clear from context to be directed to a singular form. Also, at least one of A and B and/or the like generally means A or B and/or both A and B. Furthermore, to the extent that "includes", "having", "has", "with", or variants thereof are used, such terms are intended to be inclusive in a manner similar to the term "comprising".

Many modifications may be made to the instant disclosure without departing from the scope or spirit of the claimed subject matter. Unless specified otherwise, "first," "second," or the like are not intended to imply a temporal aspect, a spatial aspect, an ordering, etc. Rather, such terms are merely used as identifiers, names, etc. for features, elements, items, etc. For example, a first set of information and a second set of information generally correspond to set of information A and set of information B or two different or two identical sets of information or the same set of information.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure. In addition, while a particular feature of the disclosure may have been disclosed with respect to only one of several implementations, such feature may be combined with one or more other features of the other implementations as may be desired and advantageous for any given or particular application.

What is claimed is:

1. A method for managing a monitoring pool of management servers, comprising:
   identifying a management server available for resource monitoring;
   sending a monitoring installer package from a remote source to the management server for remote installation of a monitoring component;
   utilizing the monitoring installer package to install the monitoring component on the management server;
   assigning the management server to a monitoring pool of management servers that monitor a resource pool;
   configuring the monitoring component to monitor a set of resources of the resource pool;
   hosting a monitoring pool management component on the remote source;
   responsive to the monitoring pool management component determining that a current monitoring load exceeds a load threshold, automatically provisioning the management server for monitoring the set of resources; and
   adjusting the load threshold based upon the provisioning of the management server.

2. The method of claim 1, the utilizing the monitoring installer package comprising:
   remotely executing the monitoring installer package, at the management server, from the remote source.

3. The method of claim 1, the resource pool comprising at least one of a storage device resource, a virtual machine resource, a storage controller resource, a server resource, an application resource, or a database resource.

4. The method of claim 1, the configuring comprising:
   configuring the monitoring component to access a resource information database.

5. The method of claim 4, comprising:
   invoking the monitoring component to store monitoring information associated with the set of resources into the resource information database.

6. The method of claim 5, the monitoring information comprising at least one of a health state of a storage device resource or a storage object of a storage device resource.

7. The method of claim 1, the identifying a management server comprising:
   creating a new virtual machine as the management server based upon the determination that the current monitoring load exceeds the load threshold.

8. The method of claim 1,
   the adjusting the load threshold further based upon a detection of a new resource within the resource pool.

9. The method of claim 1, the identifying a management server comprising:
   utilizing an auto discovery technique to identify a candidate management server;
   evaluating an available bandwidth of the candidate management server; and
   responsive to the available bandwidth exceeding a bandwidth threshold, identifying the candidate management server as the management server.

10. The method of claim 9, the utilizing an auto discovery technique comprising:
    evaluating a subnet to discover the candidate management server.

11. The method of claim 1, comprising:
    balancing monitoring loads amongst management servers assigned to the management pool.

12. The method of claim 11, the balancing monitoring loads comprising:
    removing an under loaded management server from the monitoring pool.

13. The method of claim 1, comprising:
    generating a fault tolerance metric for the monitoring pool; and
    assigning a new management server to the monitoring pool based upon the fault tolerance metric.

14. The method of claim 1, the configuring the monitoring component comprising:
   identifying the set of resources based upon at least one of a storage hierarchy similarity metric, a geographical proximity metric, or a monitoring task similarity metric.

15. A system for managing a monitoring pool of management servers, comprising:
   a monitoring pool management component, hosted on a remote source, configured to:
      identify a management server available for resource monitoring;
      send a monitoring installer package to the management server for remote installation of a monitoring component;
      utilize the monitoring installer package to install the monitoring component on the management server;
      assign the management server to a monitoring pool of management servers that monitor a resource pool;
      configure the monitoring component to monitor a set of resources of the resource pool;
      responsive to determining that a current monitoring load exceeds a load threshold, automatically provision the management server for monitoring the set of resources; and
      adjust the load threshold based upon the provision of the management server.

16. The system of claim 15, the monitoring pool management component configured to:
   remotely execute the monitoring installer package, at the management server, from the remote source.

17. The system of claim 15, the monitoring pool management component configured to:
   utilize an auto discovery technique to identify a candidate management server;
   evaluate an available bandwidth of the candidate management server; and
   responsive to the available bandwidth exceeding a bandwidth threshold, identify the candidate management server as the management server.

18. A computer readable medium comprising instructions which when executed perform a method for managing a monitoring pool of management servers, comprising:
   identifying a management server available for resource monitoring;
   sending a monitoring installer package from a remote source to the management server for remote installation of a monitoring component;
   utilizing the monitoring installer package to install the monitoring component on the management server;
   assigning the management server to a monitoring pool of management servers that monitor a resource pool;
   configuring the monitoring component to monitor a set of resources of the resource pool;
   hosting a monitoring pool management component on the remote source;
   responsive to the monitoring pool management component determining that a current monitoring load exceeds a load threshold, automatically provisioning the management server for monitoring the set of resources; and
   adjusting the load threshold based upon the provisioning of the management server.

19. The computer readable medium of claim 18, further comprising instructions for:
   remote executing the monitoring installer package, at the management server, from the remote source.

20. The computer readable medium comprising instructions of claim 19, the resource pool comprising at least one of a storage device resource, a virtual machine resource, a storage controller resource, a server resource, an application resource, or a database resource.

* * * * *